United States Patent
Toffa

(10) Patent No.: US 9,591,097 B2
(45) Date of Patent: Mar. 7, 2017

(54) SYSTEM AND METHOD FOR ENABLING PSEUDONYMOUS LIFELIKE SOCIAL MEDIA INTERACTIONS WITHOUT USING OR LINKING TO ANY UNIQUELY IDENTIFIABLE USER DATA AND FULLY PROTECTING USERS' PRIVACY

(71) Applicant: Antoine Toffa, Englewood, CO (US)

(72) Inventor: Antoine Toffa, Englewood, CO (US)

( * ) Notice: Subject to any disclaimer, the term of this patent is extended or adjusted under 35 U.S.C. 154(b) by 0 days.

(21) Appl. No.: 14/546,964

(22) Filed: Nov. 18, 2014

(65) Prior Publication Data

US 2015/0143532 A1    May 21, 2015

Related U.S. Application Data

(60) Provisional application No. 61/905,825, filed on Nov. 18, 2013.

(51) Int. Cl.
| | | |
|---|---|---|
| G06F 17/30 | (2006.01) | |
| G06F 7/04 | (2006.01) | |
| H04L 9/32 | (2006.01) | |
| H04L 29/06 | (2006.01) | |
| H04L 29/08 | (2006.01) | |
| G06Q 50/00 | (2012.01) | |
| G06Q 20/38 | (2012.01) | |
| G06F 21/62 | (2013.01) | |

(52) U.S. Cl.
CPC .......... *H04L 67/30* (2013.01); *G06F 17/3053* (2013.01); *G06F 21/6254* (2013.01); *G06Q 20/383* (2013.01); *G06Q 50/01* (2013.01); *H04L 63/0407* (2013.01); *H04L 63/102* (2013.01)

(58) Field of Classification Search
CPC ............ G06F 17/3053; G06F 21/6254; G06Q 20/383; G06Q 50/01; H04L 63/0407
See application file for complete search history.

(56) References Cited

U.S. PATENT DOCUMENTS

| | | | | |
|---|---|---|---|---|
| 5,719,560 A | * | 2/1998 | Watkins | G06F 21/31 235/382.5 |
| 5,991,882 A | * | 11/1999 | O'Connell | G06F 21/31 726/18 |
| 6,209,100 B1 | * | 3/2001 | Robertson | G06Q 10/10 705/74 |

(Continued)

OTHER PUBLICATIONS

Beach, Aaron, Mike Gartrell, and Richard Han. "Solutions to security and privacy issues in mobile social networking." Computational Science and Engineering, 2009. CSE'09. International Conference on. vol. 4. IEEE, 2009.*

(Continued)

*Primary Examiner* — Michael Simitoski
(74) *Attorney, Agent, or Firm* — Sheridan Ross P.C.

(57) ABSTRACT

A quasi-identity system and methods of operating the same are described. The quasi-identity system may be deployed as a mobile application, website, or Application Programming Interface (API) at which users thereof are allowed to share opinions and other information with one another without ever having to expose their true identity or a reference thereto (e.g., email address, phone number, etc.). Thus, users of the website never have to concern themselves with the potential loss of private information and can, therefore, share their opinions more freely.

15 Claims, 11 Drawing Sheets

Password recovery in a quasi-identity system

(56) References Cited

U.S. PATENT DOCUMENTS

| | | | | |
|---|---|---|---|---|
| 6,973,575 B2* | 12/2005 | Arnold | | G06F 21/32 |
| | | | | 713/168 |
| 7,292,680 B1* | 11/2007 | Simpson | | G06Q 20/401 |
| | | | | 370/353 |
| 7,325,141 B2* | 1/2008 | Chow | | G06F 21/31 |
| | | | | 713/150 |
| 7,861,287 B2* | 12/2010 | Pomerantz | | G06F 21/31 |
| | | | | 713/182 |
| 8,006,298 B1* | 8/2011 | Balasubramanian | ... | G06F 21/31 |
| | | | | 726/17 |
| 8,024,575 B2* | 9/2011 | Brickell | | G06F 21/40 |
| | | | | 713/176 |
| 8,078,881 B1* | 12/2011 | Liu | | G06F 21/31 |
| | | | | 713/183 |
| 8,099,765 B2* | 1/2012 | Parkinson | | H04L 9/0891 |
| | | | | 726/5 |
| 8,271,894 B1 | 9/2012 | Mayers | | |
| 8,578,501 B1 | 11/2013 | Ogilvie | | |
| 8,639,937 B2* | 1/2014 | Bagga | | G06F 21/46 |
| | | | | 707/758 |
| 8,973,113 B1* | 3/2015 | Eatough | | G06F 21/31 |
| | | | | 726/6 |
| 9,230,077 B2* | 1/2016 | Markwordt | | H04L 63/08 |
| 9,407,630 B2* | 8/2016 | Morris | | G06F 21/31 |
| 2001/0034723 A1* | 10/2001 | Subramaniam | | G06Q 20/02 |
| | | | | 705/74 |
| 2005/0256866 A1* | 11/2005 | Lu | | G06F 17/30867 |
| 2006/0042483 A1* | 3/2006 | Work | | G06Q 10/00 |
| | | | | 101/91 |
| 2006/0143067 A1* | 6/2006 | Calabria | | G06Q 10/10 |
| | | | | 705/26.1 |
| 2007/0113294 A1 | 5/2007 | Field et al. | | |
| 2008/0021958 A1* | 1/2008 | Foote | | H04L 12/1822 |
| | | | | 709/204 |
| 2008/0071602 A1* | 3/2008 | Ojakaar | | G06Q 30/02 |
| | | | | 705/14.44 |
| 2008/0288277 A1* | 11/2008 | Fasciano | | G06Q 10/00 |
| | | | | 705/319 |
| 2009/0089876 A1* | 4/2009 | Finamore | | G06F 21/40 |
| | | | | 726/21 |
| 2009/0125521 A1* | 5/2009 | Petty | | G06F 21/6263 |
| 2010/0088753 A1 | 4/2010 | Ayres et al. | | |
| 2010/0203909 A1* | 8/2010 | Oldach | | G06Q 10/10 |
| | | | | 455/466 |
| 2010/0205430 A1* | 8/2010 | Chiou | | G06Q 10/10 |
| | | | | 713/156 |
| 2011/0191200 A1* | 8/2011 | Bayer | | G06Q 20/12 |
| | | | | 705/26.1 |
| 2012/0215658 A1* | 8/2012 | Estrada | | G06Q 30/06 |
| | | | | 705/26.41 |
| 2012/0226701 A1* | 9/2012 | Singh | | G06F 21/40 |
| | | | | 707/748 |
| 2012/0317217 A1* | 12/2012 | Lavy | | G06Q 10/10 |
| | | | | 709/206 |
| 2013/0054357 A1* | 2/2013 | Mager | | G06Q 30/02 |
| | | | | 705/14.49 |
| 2013/0066885 A1* | 3/2013 | Komuves | | G06Q 10/10 |
| | | | | 707/748 |
| 2013/0097697 A1 | 4/2013 | Zhu et al. | | |
| 2014/0150109 A1* | 5/2014 | Fire | | G06F 21/6245 |
| | | | | 726/26 |
| 2014/0157382 A1* | 6/2014 | Ford | | H04L 63/08 |
| | | | | 726/7 |
| 2014/0282870 A1* | 9/2014 | Markwordt | | H04L 63/08 |
| | | | | 726/3 |
| 2014/0317699 A1* | 10/2014 | Truong | | H04L 63/08 |
| | | | | 726/5 |
| 2015/0106446 A1* | 4/2015 | Brophy | | G06Q 50/01 |
| | | | | 709/204 |
| 2015/0178279 A1* | 6/2015 | Chen | | G06F 17/3053 |
| | | | | 707/748 |
| 2015/0261759 A1* | 9/2015 | Rodriguez | | G06Q 50/01 |
| | | | | 707/723 |
| 2015/0268818 A1* | 9/2015 | Zewail | | G06F 17/30867 |
| | | | | 715/765 |
| 2015/0331864 A1* | 11/2015 | Lucas | | G06F 17/3053 |
| | | | | 707/692 |

OTHER PUBLICATIONS

Sirivianos, Michael, Kyungbaek Kim, and Xiaowei Yang. "FaceTrust: Assessing the Credibility of Online Personas via Social Networks." IACR Cryptology ePrint Archive (2009): 152.*

Such, Jose M., et al. "Partial identities as a foundation for trust and reputation." Engineering Applications of Artificial Intelligence 24.7 (2011): 1128-1136.*

Fedushko, Solomia, and Yuriy Syerov. "Design of registration and validation algorithm of member's personal data." International Journal of Informatics and Communication Technology (IJ-ICT) 2.2 (2013): 93-98.*

International Search Report and Written Opinion for International (PCT) Patent Application No. PCT/US2014/066100, mailed Feb. 19, 2015 10 pages.

* cited by examiner

SYSTEM AND METHOD FOR ENABLING PSEUDONYMOUS LIFELIKE SOCIAL MEDIA INTERACTIONS WITHOUT USING OR LINKING TO ANY UNIQUELY IDENTIFIABLE USER DATA AND FULLY PROTECTING USERS' PRIVACY

CROSS-REFERENCE TO RELATED APPLICATIONS

The present application claims the benefit of U.S. Provisional Patent Application No. 61/905,825, filed on Nov. 18, 2013, the entire contents of which are hereby incorporated herein by reference.

FIELD OF THE DISCLOSURE

The present disclosure is generally directed toward mobile application or website operations and more particularly toward operating a mobile application or website that enables pseudonymous interactions.

BACKGROUND

To track online users and target them for marketing and advertising purposes, current social networks, such as Facebook, Google+, Twitter, and LinkedIn, all favor "real identity" paradigms associated with "privacy controls." The problem with "real identity" is that there is always a risk that a user's personal data may be sold, leaked (intentionally or by error), hacked, or subpoenaed by the government and that the "privacy controls", in the end, don't control anything.

Even with the advent of newer systems based on "online personas", "fake personas", "avatars", or "aliases", these systems always establish a link between the "online personas" or "avatars" and the uniquely identifiable data of their users' real identities. As a result, even with such systems based on online personas, users' privacy can also be easily jeopardized; it only takes one keystroke error, one hacker, or one government subpoena to access the database of online personas or avatars and retrieve associated users' real identities.

To determine users' identities, current social networks, such as Facebook, Google+, Twitter and LinkedIn use two types of identifiers: (a) Direct unique identifiers and (b) Indirect identifiers.

Direct unique identifiers enable the direct identification of individuals through unique identity attributes such as full name (e.g., first name, last name, middle initial, etc.), physical address, email address, phone number, social security number, and personal photos. These direct unique identifiers offer the easiest way to uniquely identify a person. Just one of these identifiers (e.g. a full name, a physical address, or a mobile phone number) will invariably lead to the user's real identity.

Indirect identifiers provide a less obvious way to identify an individual, but by combining relevant indirect identifiers, it is possible to quickly piece together someone's real identity. Indirect identifiers include such identity attributes as gender, date of birth, occupation, city of residence, workplace, location at a given time, shopping activity, friend connections, etc. For instance, in a small city, it will be very easy to determine a teacher's real identity by only knowing the teacher's gender, his/her date of birth and the school where he or she works. Or even two indirect identifiers may be enough to establish someone's identity; for instance, an online search with the two indirect identifiers "VP of Marketing" in "company X" will also generate a unique real identity.

With direct unique identifiers or via a combination of indirect identifiers, current social networks and potential eavesdroppers—individuals, hackers and government authorities—can easily track users' identities or derive them, thus intruding on users' privacy.

Accordingly, a need exists for an online solution that does not compromise users' privacy the way that current social media platforms do.

SUMMARY

It is, therefore, one aspect of the present disclosure to provide a mechanism for protecting online users' privacy. Specifically, to protect online users' privacy, a new form of user identity, referred to herein as "quasi-identity", is provided. A quasi-identity enables a user that shares enough information about users' profiles to engage in meaningful social media interactions but not too much information so as to avoid invading or exposing a users' privacy.

In the proposed "quasi-identity system", there is absolutely no way to derive users' real identities from their inputted data. This is due to the simple fact that the quasi-identity system is built around the notion of identity, not built on identity itself. An online quasi-identity system as proposed herein can function based on the following inputs: (1) one input for a pseudonym; (2) a second input for a password; and (3) a third input for dynamic life roles, also referred to herein as "voices". Any user can have multiple life roles or "voices", and choose to participate in social media using one or several of these voices. Some non-limiting examples of voices include: user, customer, student, friend, co-worker, citizen, hobbyist, alumnus, roommate, advocate, creator, founder, employee, homemaker, professional, consultant, contractor, parent, relative, patient, partner, believer, preacher, teacher, volunteer, donor, writer, team member, coach, athlete, competitor, politician, trainer, group leader, manager, representative, owner, boyfriend, girlfriend, tenant, spouse, divorcee, club member, charity member, religious participant, traveler, lesbian, gay, bisexual, transgender, Asian, Caucasian, African-American, Hispanic, Native American, etc.

It should be noted that the "quasi-identity" concept is different from an "online persona", "fake persona", "alias" or "avatar" for which a user builds new online personalities, say Alias1, Alias2, Alias3, etc. that are known by the online public as Alias1, Alias2, Alias3. In the case of a "quasi-identity", the user has only one pseudonym, say "Pseudo", and is known by the online public only as "Pseudo". "Pseudo" uses various life roles or "voices" depending on the context of the social media interaction. It is up to the user to determine which and how many voices she wants to use publicly to communicate effectively while adequately protecting her privacy.

With a quasi-identity, a person can meaningfully participate in social media without incurring the privacy risks described above. If a person steals, leaks, or hacks a quasi-identity, the user's real identity behind the quasi-identity is never compromised since real identity direct or indirect identifiers were never entered into the system in the first place. The quasi-identity concept is a useful element of a privacy-centric social network.

Social voicing, as described herein, is the act of using various online voices as part of one's quasi-identity. An online voice is different from an online persona. A user can have multiple online voices, even simultaneously, whereas a user can only have one persona at a time. Furthermore, online voices, like life roles, are dynamic and ever changing depending on the context surrounding the user. Online personas, on the other hand, are fixed and correspond to new, simulated identities.

In a privacy-centric social network, all individuals have a quasi-identity defined by a username and one or more online voices. As a result, those individuals' real identities are kept unknown. However, certain public figures and famous individuals, by virtue of their very public activities (entertainment, politics, sports, leadership roles, etc.), may want and need to participate in a privacy-centric social network with their real identities, not quasi-identities. In the same way, public entities, such as companies, associations, non-profit organizations, may need to participate with their real identities in the conversations occurring in a privacy-centric social network. The fact that, in a privacy-centric social network, some individuals require total privacy using quasi-identities while others like celebrities and public entities use real identities is defined as "asymmetric privacy". Asymmetric privacy is a new concept since traditional social networks have avoided the co-mingling of real identities and non-real-identities and failed to consider the usefulness of a quasi-identity as described herein.

In a privacy-centric social network, most individuals participate in public discussion under a pseudonym and a quasi-identity. The "credibility score" described herein is a unique mechanism that allows users to gauge the believability of opinions expressed by contributors by focusing on their voices. For instance, a user may be very credible using the voices of a mother and an executive, but less credible using the voice of a fireman. Traditional social networks have developed different, simpler overall "reputation scores", "influence scores" and "karma scores" that usually rely on mathematical formulas such as:

$$\text{credibility score}=(\text{positive feedback rec'd}-\text{negative feedback rec'd})/\text{positive feedback rec'd}$$

The "credibility score", as discussed herein, is a much more comprehensive and useful approach to evaluating the credibility of contributors' voices by factoring in such variables as time as a member, voices used, frequency of contributions and in what voice, length of contributions, positive feedback given and received, negative feedback given and received, distribution of contributions over time, abuse reporting, first opinions, etc. A score of 20% suggests not to believe more than 20% of the claims made by the contributor in a given voice, whereas a score of 95% points to a very credible contributor in that voice (the theoretical maximum of the "credibility" score is 100%). For any new member of the privacy-centric social network, the "credibility score" is arbitrarily set at 50% indicating that, since he is an unknown entity to the algorithmic system, he is neither to be believed or not to be believed.

In the user interface of the privacy-centric social network, the credibility score of a member can be directly tied to the level of visibility of her opinions and content. With a high credibility score, a member will see her opinions and content highly visible and promoted using a combination of visibility variables such as link rank, rich media inclusion (such as pictures, video links), background color, font color, font size, etc. With a low credibility score, a member will see his opinions and content less visible and demoted (or even hidden in the case of an extremely low score due to abuse report) using the same combination of visibility variables.

Users of the privacy-centric social network are given the opportunity when expressing their opinions to rate anything, using a universal rating system. This system is based on a universal taxonomy, i.e. a classification of everything, that triggered by one user input (the selection of a rating subject (e.g., "am I rating an article, a company, a service, a product, a game or a movie?"), generates satisfaction drivers (or variables) from a "rating driver engine". Users then use these satisfaction drivers to rate the subject of their choice.

A privacy-centric social network, as disclosed herein, may be accessible from anywhere at any time, with a single sign-on. Users can also contribute opinions to the privacy-centric social network anywhere on the Internet via a single sign-on. To remain at users' fingertips, opinions can be generated and made accessible from mobile applications and/or Web browsers, removed only one click away. The privacy-centric social network forms a virtual "hypernet" that sits on top of the Internet; every URL, Web page or even element of a Web page can potentially have associated opinions. The privacy-centric social network hypernet can be instantly accessed via the camera or the URL/QR scanner of a smartphone as well as via Web browsers. Such "single sign-on hypernet of the privacy-centric social network" concept does not exist today.

It should be appreciated that users can access opinions, or more specifically any content shared over the privacy-centric social network, via a number of mechanisms. A first way to access the social network contents is to directly interact with the privacy-centric social network (e.g., via logging-in to www.Opinions.com). A second way to access the social network contents (or share opinions) is via an Application Programmers Interface (API) that provides capabilities of the privacy-centric social network to other websites. For instance, a user may provide, update, or review opinions from www.Opinions.com via a third-party website selling objects that have been discussed on the privacy-centric social network. An example of a third-party website that may benefit from the opinions shared on www.Opinions.com may include www.amazon.com, itunes libraries, online application stores, etc. The third-party website may include both traditional websites as well as any mobile services. A third way to access the social network contents (or share opinions) is to utilize the API via a universal login that is based on the quasi-identity discussed above. A user can view, update, and share opinions on a third-party website by logging into the third-party website with their universal login based on the quasi-identity. A fourth way to access the social network contents (or share opinions) is to utilize an application developed to interact with the other components of the privacy-centric social network (e.g., use a dedicated application).

In some embodiments, a privacy-centric social network is provided that generally comprises:

one or more servers connected to a communication network, the one or more servers comprising processor-executable instructions that, when executed by a processor, enable the servers to facilitate interactions between private website members, wherein the processor-executable instructions include:

an identity services module that maintains quasi-identities of the private website members, wherein quasi-identities of the private website members includes no identifiable data for the private website members; and a publishing services module that publishes opinions made by private website members for viewing and reaction by other private website members.

As used herein, the term "website members" should be construed to include members that employ the services offered by the social media network described herein. It should be appreciated that some of these "website members" may access such services via traditional website channels whereas other "website members" may never actually visit a website for the social media network. Instead, the services may be utilized via an application running on the members' communication device or mobile device, via an API, or via any other channel described herein. Therefore, the term "website members" is intended to encompass all such members of the privacy-centric social media network, regardless of whether such members use an application, website, API, or some other channel to exchange opinions with other members.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be a graph database as described herein. Accordingly, the disclosure is considered to include a tangible storage medium and prior art-recognized equivalents and successor media, in which the software implementations of the present disclosure are stored.

The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

It should be appreciated that embodiments of the present disclosure propose a completely new paradigm for a social network and features available to such a social network. It should be appreciated that the social network and the features described in connection therewith can be provided/facilitated by one or more servers. Moreover, the features disclosed herein may be provided in other types of social networking platforms that do not necessarily rely on a quasi-identity system.

Figure 1:
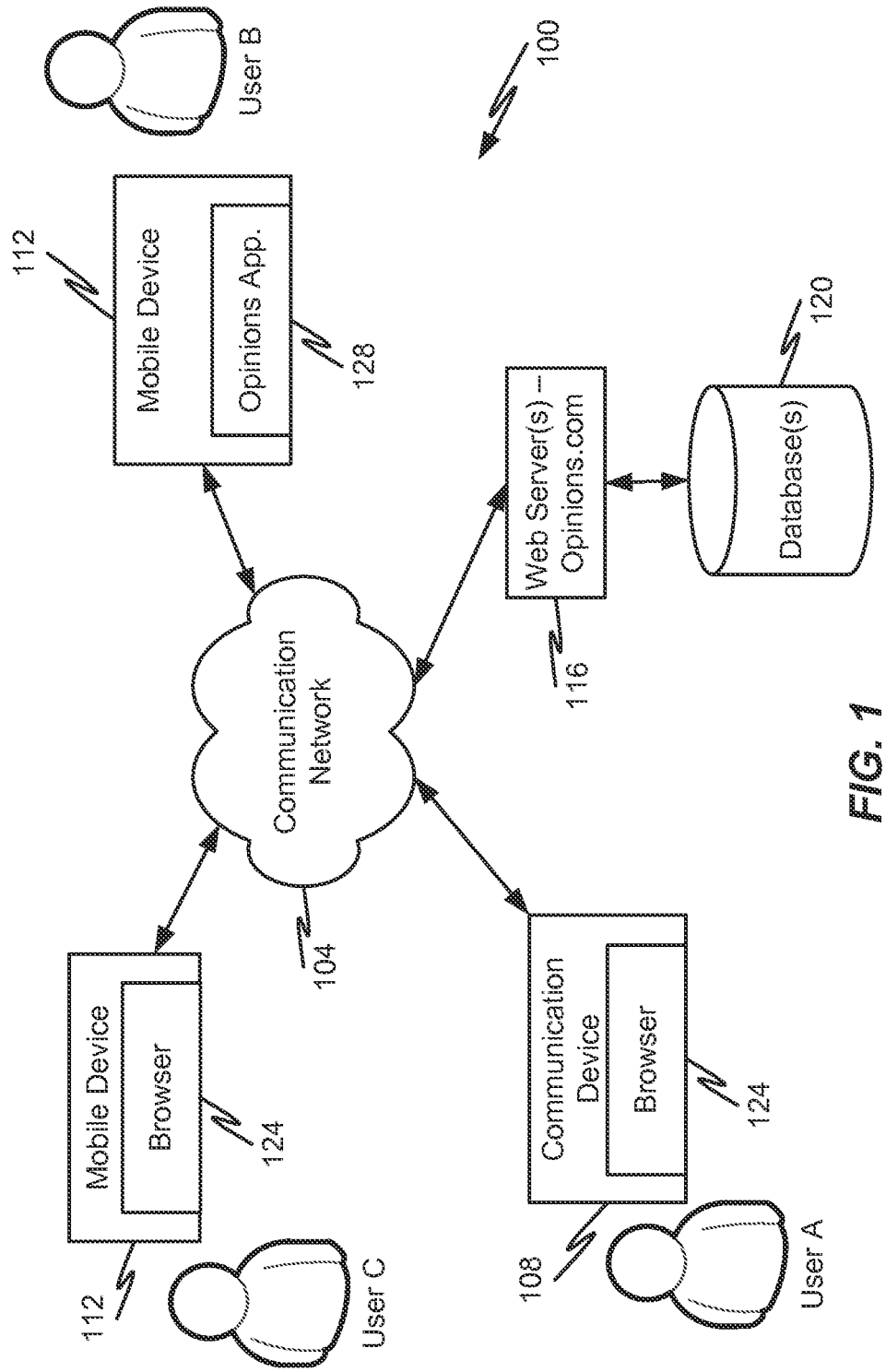
FIG. 1 is a block diagram depicting a communication system in accordance with embodiments of the present disclosure.

FIG. 1 shows an illustrative embodiment of a communication system 100 in accordance with at least some embodiments of the present disclosure. The communication system 100 may be a distributed system and, in some embodiments, comprises a communication network 104 connecting one or more system components (e.g., network devices). In some embodiments, the network 104 provides a communication medium or fabric that enables various users to interact with one another via a social networking application or website 116. In some embodiments, the social networking application or website 116 is executed as one or multiple servers (e.g., web servers) that provide web services to client devices operated by the users.

It should be appreciated that the services of the application or website 116 may be made available to users (e.g., User A) in a traditional fashion (e.g., via browser 124 of a communication device 108) using known or yet-to-be-developed web protocols (e.g., SOAP, WSDL, XML, JSON, REST, XLANG, UDDI, WPS, WSFL, WSCL, Hessian, etc.). The services of the application or website 116 may alternatively or additionally be made available to a browser 124 operating on a mobile communication device 112 or to a dedicated application (e.g., opinions application 128) operating on the mobile communication device 112. Moreover, the platform used to deliver content from the server(s) 116 to the devices 108, 112 may include any type of web service framework (e.g., Apache, gSOAP, Java Web Services Development, XFire, XML Interface for Network Services, etc.). Said another way, the features and services described in connection with the deployment of a social media network or application or website 116 can be made available to users (e.g., User A, User B, User C, etc.) using any type of known distribution technology or combination of technologies. Information from the server(s) 116 may be delivered to the browser 124 using HTML, HTML4, HTML5, etc.) and/or information from the server(s) 116 may be delivered to the dedicated application 128 using any type of open or proprietary delivery mechanism, protocol, framework, etc.

As can be seen in FIG. 1, the server(s) 116 may also be connected to one or more databases 120 that are used to store and organize information about users including their quasi-identification information as well as opinions that users of the application or website 116 have prepared, shared, rated, commented on, forwarded, viewed, etc. The database 120 may be any type of combination of databases known in the art. The database 120 may comprise a SQL or non-SQL database and may be hierarchical, a graph database, a spatial database, an XML database, a temporal database, a real-time database, or the like.

In accordance with at least some embodiments of the present disclosure, the communication network 104 may comprise any type of known communication medium or collection of communication media and may use any type of protocols to transport messages between endpoints. The communication network 104 may include wired and/or wireless communication technologies. The Internet is an example of the communication network 104 that constitutes and Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a LAN, a WAN, a Session Initiation Protocol (SIP) network, a Voice over IP (VoIP) network, a cellular network, and any other type of packet-switched or circuit-switched network known in the art. In addition, it can be appreciated that the communication network 104 need not be limited to any one network type, and instead may be comprised of a number of different networks and/or network types. Moreover, the communication network 104 may comprise a number of different communication media such as coaxial cable, copper cable/wire, fiber-optic cable, antennas for transmitting/receiving wireless messages, and combinations thereof.

The communication device 108 may correspond to a communication endpoint or user device and may be configured for use by one or multiple users. In the depicted example, communication device 108 corresponds to a communication endpoint utilized by User A to exchange messages and opinions with other users via the application or website 116. Examples of a communication device 108 include, without limitation, a Personal Computer (PC), a laptop, a tablet, a PDA, a smartphone, a thin client, or the like.

A mobile device 112 is a specific type of communication device 108 that is designed for mobile use. Examples of mobile devices 112 include, without limitation, cellular phones, smart phones, tablets, PDAs, etc.

As previously mentioned, the application or website 116 may correspond to one or multiple servers (e.g., a server cluster) that are used to facilitate the exchange of user opinions. Although not depicted, other servers (e.g., servers) may also be connected to the communication network 104, although such additional servers may not necessarily be under the control/administration of the entity administering the application or website 116 (which may also be referred to herein as opinions.com). The application or website 116 may facilitate the exchange of user opinions about content on opinions.com, or at other websites. Furthermore, the application or website 116 may enable users thereof to exchange opinions about any other topic (e.g., current events, weather, stories, books, etc.).

In some embodiments, there are four tiers of privacy available to members of the application or website 116. In particular, the application or website 116 affords a quasi-identity system whereby members do not have to share any private or sensitive information with the application or website 116 to participate therein. A first tier of privacy for members (e.g., users) is a fully-private identity where a single member can create a quasi-identity, create and request opinions for consumption by other members of the application or website, and whose profile is kept completely private (e.g., no information regarding the user with the exception of the quasi-identity is shared with other members). As mentioned before, the quasi-identity information and opinions made and viewed by a member may be stored in one or more databases 120 such that they can be referenced and viewed by other members.

A second tier of privacy for members is a semi-private tier whereby individual users with quasi-identities are allowed to connect with other members. Once connected, a connected "buddy" can have access to some profile information for other "buddies." Additionally, the connected "buddies" may further be enabled to share directed communications with one another (e.g., directed messages via the servers 116). While directed communications are facilitated, since the members do not share their actual contact information (e.g., email, phone number, etc.), there is no provision for sharing directed communications beyond the messaging capabilities of the application or website 116.

A third tier of privacy for members is a semi-public tier whereby individual users with quasi-identities are allowed to create and moderate subtopics or new opinion threads. These semi-public users still only have to share their quasi-identity with other members; however, their elevation to the third tier may be vetted by an administrator of the application or website 116 and may be predicated upon the member sharing valuable and non-inflammatory opinions via the application or website 116. These types of members may have additional profile information shared with other members, but again no exposure of the members' true identity, email address, contact information, etc. are shared with the application or website 116, thereby making it impossible for the application or website 116 to share (intentionally or unintentionally) the information with others.

A fourth tier of privacy for members is the public tier whereby public groups, companies, public figures (e.g., politicians, sports stars, movie stars, corporate leaders, etc.), and the like share their real identity. This is the one exception to fully-private membership, but it is based upon the understanding that certain individuals and organizations may wish to share opinions with other members in a public fashion (e.g., have a public association with their opinion). Public members have the ability to share some or all of their profile information with other members. Public groups and figures may also have a "prime voice" belonging to a leader of the organization. This prime voice may be provided with control privileges over the other voices (e.g. "fellow voices") given to other individuals in the organization.

Figure 2:
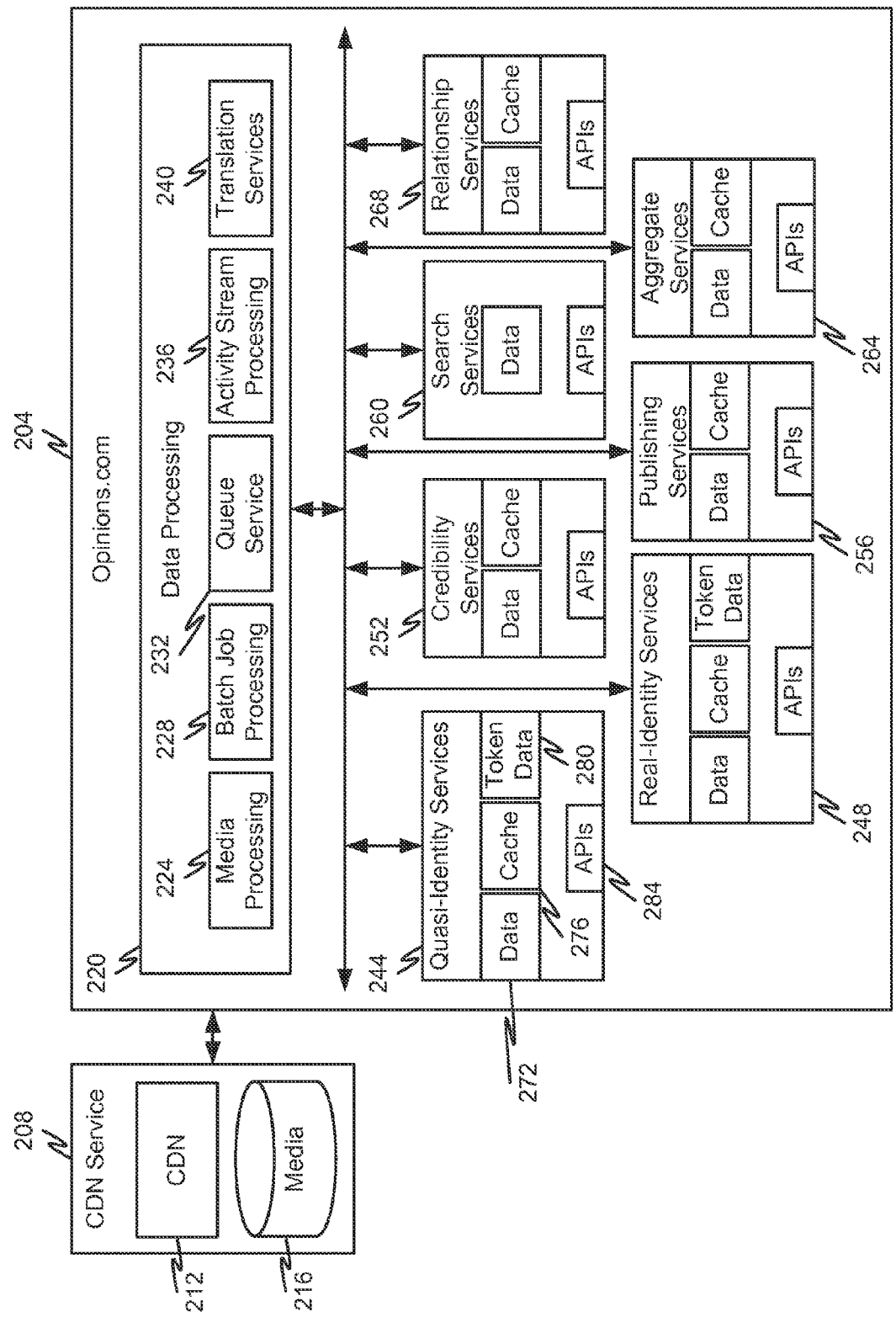
FIG. 2 is a block diagram depicting a server in accordance with embodiments of the present disclosure.

With reference now to FIG. 2, additional details of a application or website (e.g., opinions.com) 204 and the components thereof will be described in accordance with at least some embodiments of the present disclosure. The application or website 204 may be similar or identical to the application or website 116 or combination of application or website 116 and database 120. The application or website 204 is shown as being connected to a Content Delivery Network (CDN) service 208 that has one or more CDNs 212 and media 216. The CDN 212 and media 216 may be made available to users of the application or website 204 in response to requests by the application or website 204 and/or members of the application or website 204. When a member resolves to a particular page (e.g., HTML page) or content of application or website 204, the CDN service 208 may utilize the CDN 212 to distribute the media 216 associated with the requested page or content. This enables the application or website 204 to operate more efficiently in its distribution of media to its members.

Within application or website 204 there is a data processing portion 220 having a media processing module 224, a batch job processing module 228, a queue service module 232, an activity stream processing module 236, and a translation services module 240. The application or website 204 is also shown to include a plurality of service modules including a quasi-identity service module 244, a real-identity services module 248, a credibility services module 252, a publishing services module 256, a search services module 260, an aggregate services module 264, and a relationship services module 268. The services each include an Application Programming Interface (API) 284, data 272, and a cache 276. Some of the services further include token data 280.

Each API 284 may enable the services to interface with the other components of the application or website 204. For instance, the API 284 of a service may include a set of routines, protocols, and tools for building software applications within the application or website 204. An API 284 may express a software component in terms of its operations, inputs, outputs, and underlying types. An API 284 specifies how software components should interact within the application or website 204.

The data 276 of a service may correspond to the specific data used to provide/operate that service and/or the data that has been saved in connection with a service. For instance, quasi-identity services 244 may have data 272 that includes the quasi-identities of members of the application or website 204. Alternatively or additionally, the data 272 of the quasi-identity services 244 may include data that allows the quasi-identity services 244 to provide and maintain quasi-identity services for a member (e.g., rules for maintaining quasi-identities, required information for a quasi-identity, how to store quasi-identities, how to retrieve quasi-identities, etc.).

The cache 276 of a service may correspond to a temporary data-storage area for that service. In particular, when a service is running a routine or operation, the cache 276 may be used for temporary storage of data needed to run the routine or operation.

The token data 280 may correspond to another type of data in a service. Whereas the data 272 corresponds to specific data for a service, the token data 280 may include authentication data or other data that secures the data 272 from unauthorized use/access. For instance, the token data 280 may define authentication data in the form of a username, password, or the like.

As can be appreciated, the quasi-identity services module 272 may be responsible for providing and managing quasi-identity services within the application or website 204. Any enrollment, creation, or modification of a quasi-identity may be processed through the quasi-identity services module 244.

The real-identity services module 248 may correspond to a different module that manages the real identities of certain application or website members. For instance, the real-identity services module 248 may correspond to a separate module that manages identities for public members and organizations. While operating in a similar fashion to the quasi-identity services module 272, the real-identity services module 248 should be maintained as a separate module to ensure quasi-identities are not inadvertently mixed with real identities.

The credibility services module 252 may be responsible for monitoring the opinion activity of members (public and private) as well as analyzing the opinion activity of members. As members continue to interact with the application or website 204 and provide opinions, consume opinions, etc., the credibility services module 252 may define new credibility scores for each member, or more specifically each member's voice. Thus, each member may have multiple voices and, therefore, multiple different credibility scores, one for each voice. The credibility scores may be relied upon by other members to initially decide whether to read a member's opinion, whether to follow/connect with another member based on their opinion history, etc. The credibility services 252 provides the mechanism for highlighting, in a positive way, member activity that is deemed positive while minimizing deemphasizing (e.g., lowering within lists) member activity that is deemed less positive. The credibility services 252 provides a way of enforcing some feedback and control within the application or website 204 even though most members (e.g., all private members) are providing opinions within the application or website 204 pseudonymously.

The publishing services module 256 provides the capability of the application or website 204 to publish opinions from one member to other members. Specifically, a member may provide a single opinion using one of their voices on the application or website 204 and then the publishing services module 256 may make that opinion available to other members (or non-members).

The opinions may be maintained with certain metadata in the database 120. As such, a search services module 260 may enable the efficient searching of the database 120 to find certain opinions or a set of opinions. In some embodiments, the search services module 260 enables members to search for opinions of other members or to search for opinion topics set up by subtopic moderator.

The aggregate services module 264 may enable the aggregation of multiple services or it may provide the ability to perform multiple services at once. In some embodiments, the aggregate services module 264 enables the application or website 204 to provide members with multiple service features at the same time.

The relationship services module 268 may be responsible for managing the relationships and/or communications between "connected" members. Specifically, when two or more members decide to connect with one another, the relationship services module 268 may provide the ability to manage that connection and communications (e.g., web-based but directed communications) between those members.

Figure 3:
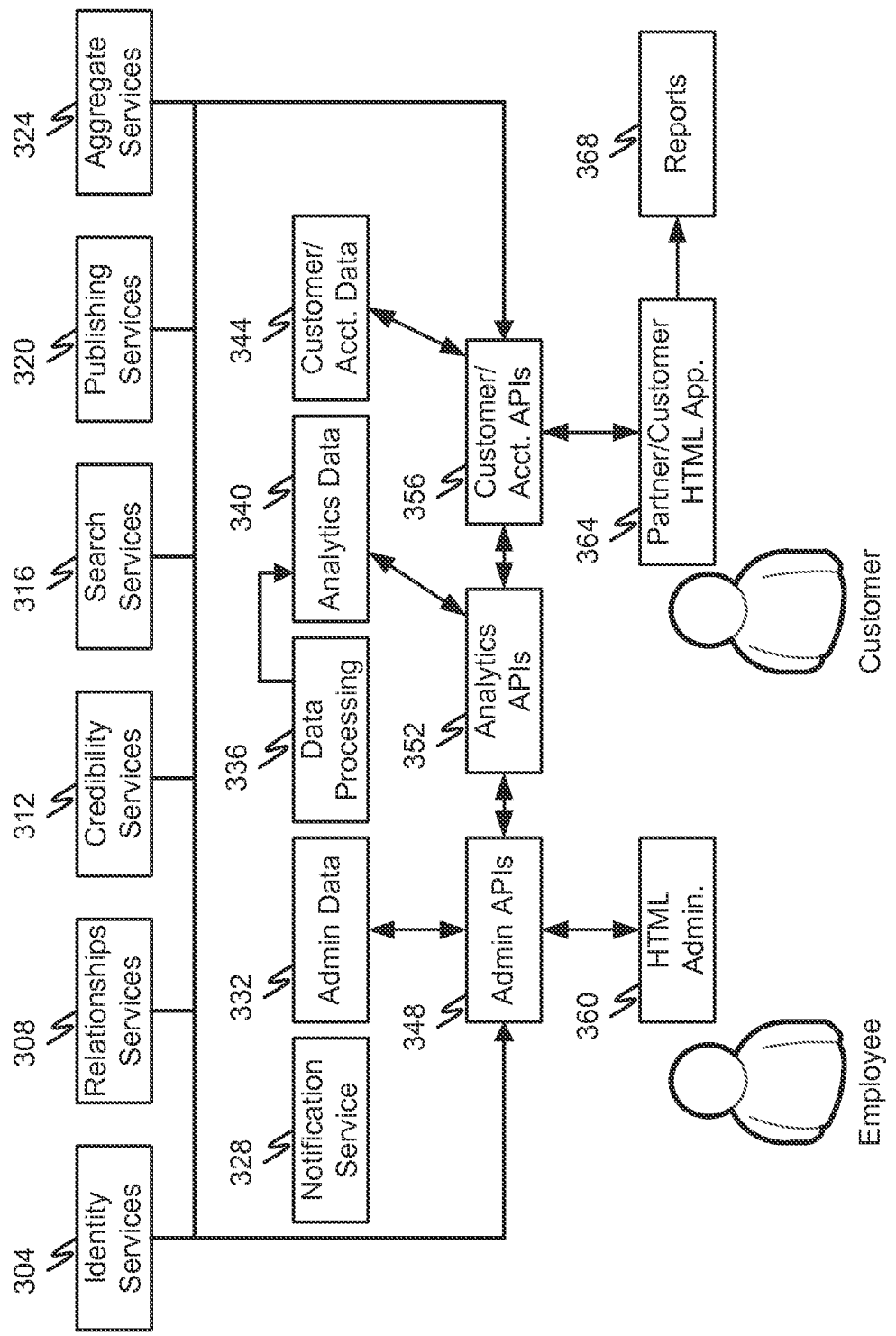
FIG. 3 is a block diagram depicting an administration system in accordance with embodiments of the present disclosure.

With reference now to FIG. 3, additional details of the application or website 204 and the administration thereof will be described in accordance with at least some embodiments of the present disclosure. The services 304, 308, 312, 316, 320, 324 are shown as being administratable by an administration API 348 and/or customer account API 356. The services 304, 308, 312, 316, 320, 324 may be similar or identical to the services described in connection with FIG. 2, with the exception that the identity services 304 may represent the combination of the quasi-identity services module 244 and real-identity services module 248. Additional services within the application or website may include a notification service 328 that operates much like a publishing service except that the notification service 328 provides notifications to system administrators via the HTML administrator portal 360. Notifications of certain activities or opinions may be sent to an administrator in response to various types of data (e.g., administration data 332, analytics data 340, and customer account data 344 being processed 336 within the application or website). Customer/member activity may be continuously monitored and processed by the data processing 336 via the analytics API 352 and customer account API 356. Whenever a customer/member activity meets some predetermined rules (e.g., is deemed inappropriate, exceptional, etc.), as determined by the data processing 336, then notifications may be provided back to the member through the customer application 364 or browser in the form of a report 368. Alternatively or additionally, the feedback may be provided to a system administrator via an interface 360, thereby allowing the application or website employee to take remedial actions, if necessary.

Figure 4:
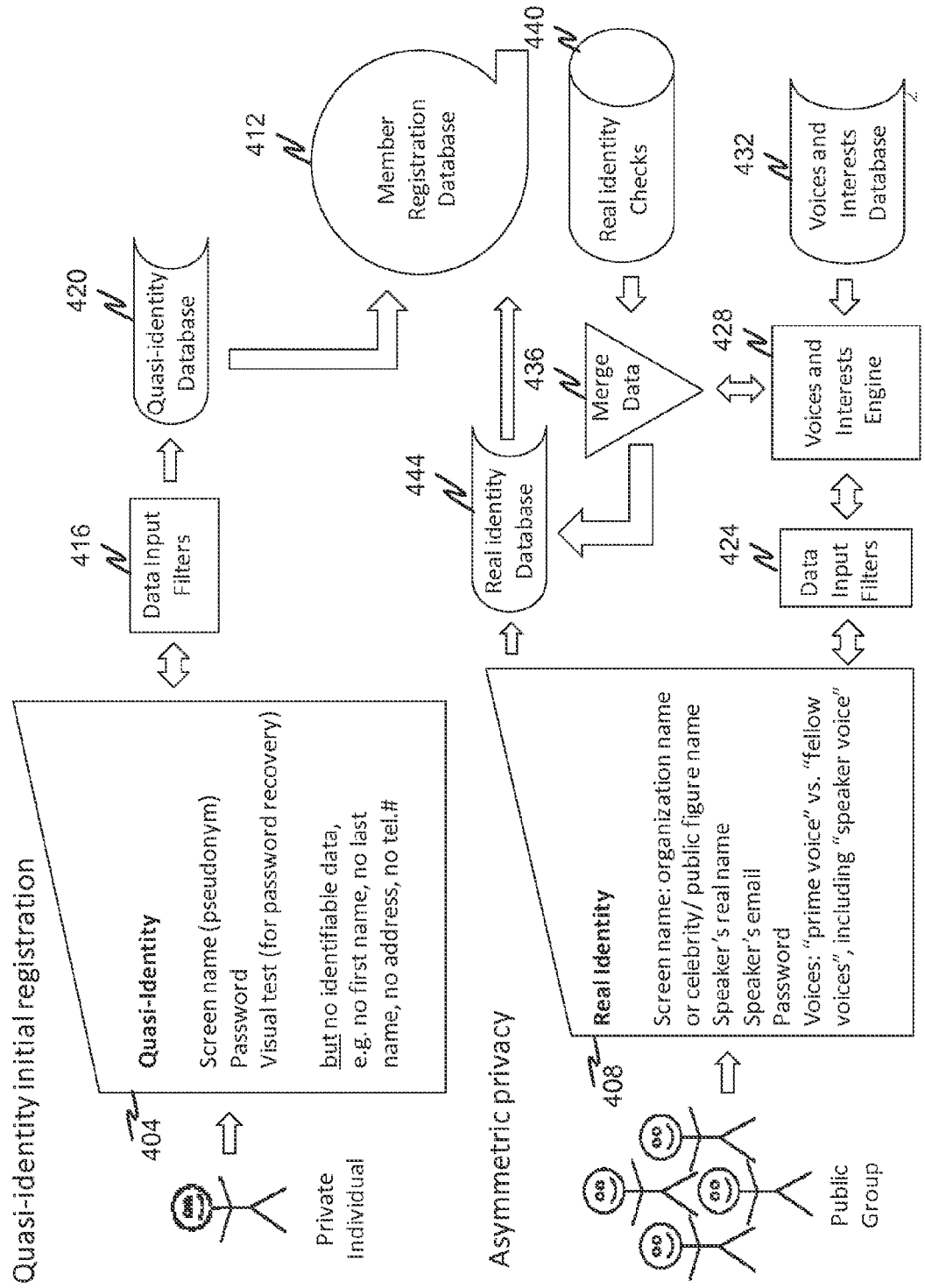
FIG. 4 is a diagram depicting a registration process in accordance with embodiments of the present disclosure.

With reference now to FIG. 4, a process for quasi-identity initial registration will be described in accordance with at least some embodiments of the present disclosure. A private individual may register 404 using a quasi-identity whereas a public group or figurehead may register 408 using a real identity. The information requested in a quasi-identity registration process may include a screen name (e.g., pseudonym), password, and visual test (e.g., for password recovery since an email is not being requested). The important thing to note for quasi-identity registration is that no identifiable data is requested or maintained for a private member (e.g., no telephone, first name, last name, address, email address, contact information, etc.). This is why the visual test is so important, because password recovery protocols using email/contact information cannot be fulfilled for private members.

On the other hand, public member registration requests a screen name (e.g., organization name, celebrity name, public figure name, etc.), along with the speaker's real name, email address, password, and voices. The definition of voices may include the request for prime voice and fellow voices, including speaker voices. This data enables the public member to control its various voices through the prime voice. The quasi-identity registration information is provided to a member registration database 412 and a quasi-identity database 420 via a data input filter 416 (ensuring the required registration information is received, but no more).

Similarly, the real identity registration information may be provided to a real identity database 444 and the member registration database 412 via a data input filter 424. The data input filter 424 may be responsible for ensure that the minimum amount of data required for public member registration is received. However, additional checks for the real identity may be required to ensure that someone is not nefariously assuming a real identity of someone else. Thus, the real identity registration data may be processed by a voices and interest engine 428 and stored within the voices and interests database 432. Then the data may be merged 436 and analyzed against a real identity checkpoint 440 to see if the real identity registration information corresponds to the real identity of the person. Specifically, emails, feedback calls, or the like may be made to the address of the real person that appears to be registering with the application or website. For instance, if a company is attempting to register, then known figureheads within the company or Public Relationship personnel within the company may be contacted to ensure the registration is occurring under the direction of the company. Other identity checks may be less invasive. For instance, the contact information of the real identity of an organization may be compared with known contact information for that organization or with rules that help determine whether the contact information appears valid. If the real identity checks out as being authentic, then the registration information is stored in the databases 444, 412.

Figure 5:
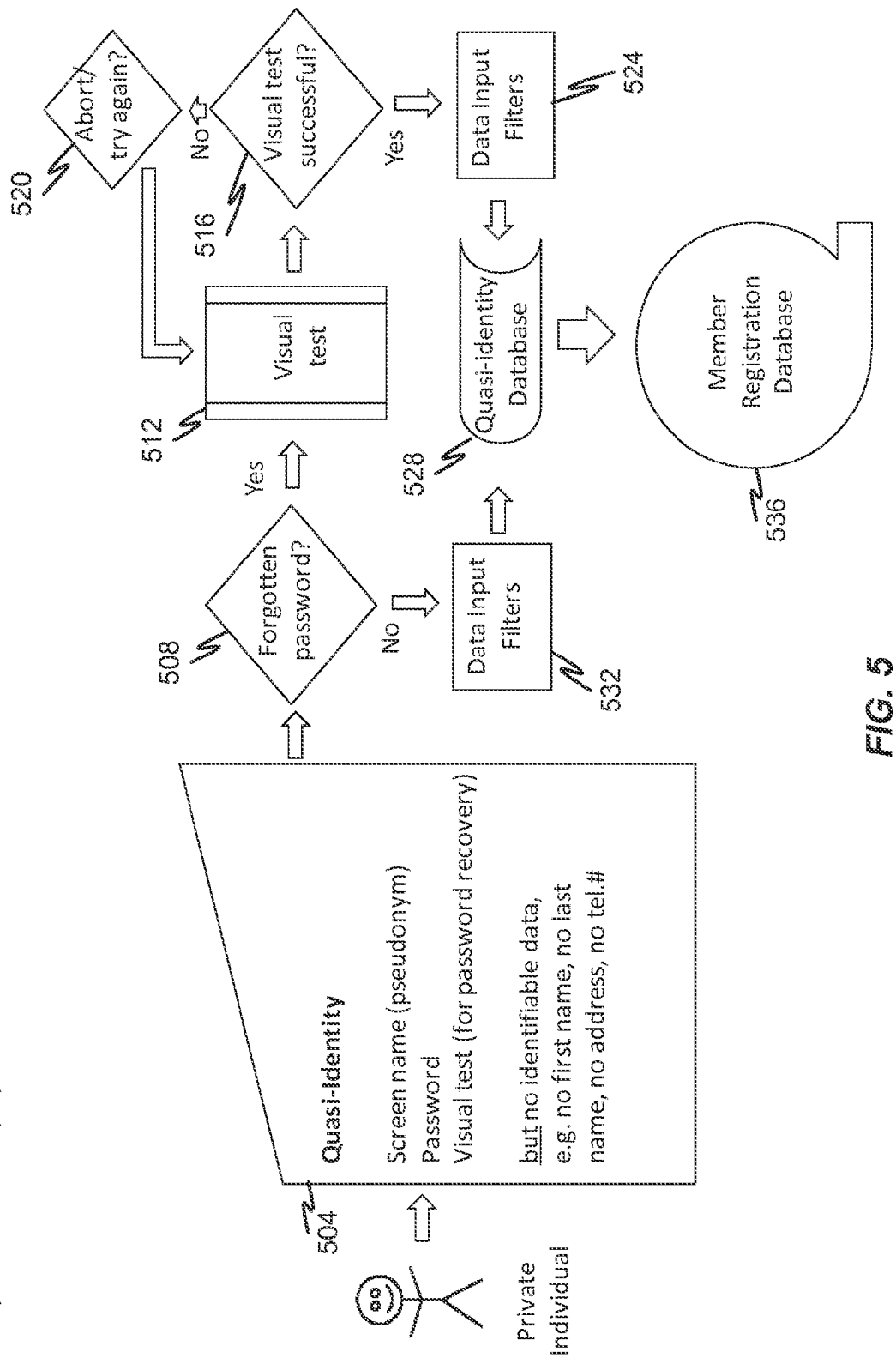
FIG. 5 is a diagram depicting a password recovery process in accordance with embodiments of the present disclosure.

With reference now to FIG. 5, a password recovery process will be described for a private member in accordance with at least some embodiments of the present disclosure. As mentioned above, the private members do not share their contact information with the application or website, which makes password recovery somewhat challenging. Thus, the password recovery process entails initially receiving the quasi-identity registration information from the member 504 (which may be similar or identical to process 404). If the member indicates that their password has been lost or forgotten (step 508), then a password recovery process is initiated whereby a visual test is given to the member 512. If the visual test is determined to be successfully completed (step 516), then the data input filters 524 are updated and a new password may be provided/assigned to the member, at least on a temporary basis. This updated password information may be stored in the quasi-identity database 528 and member registration database 536. On the other hand, if the visual test 512 is not completed successfully, then the decision is made whether to try again or abort the process (step 520). If aborted, then the process ends. If the decision is made to try again, then another or a new visual test 512 is given to the member and the process continues back to step 516.

Referring back to step 508, if the member has not forgotten their password, then the visual test 512 is not required and a member is allowed to login with the application or website. Once logged in, the member may update their password information and/or visual tests via data input filters 532.

Figure 6:
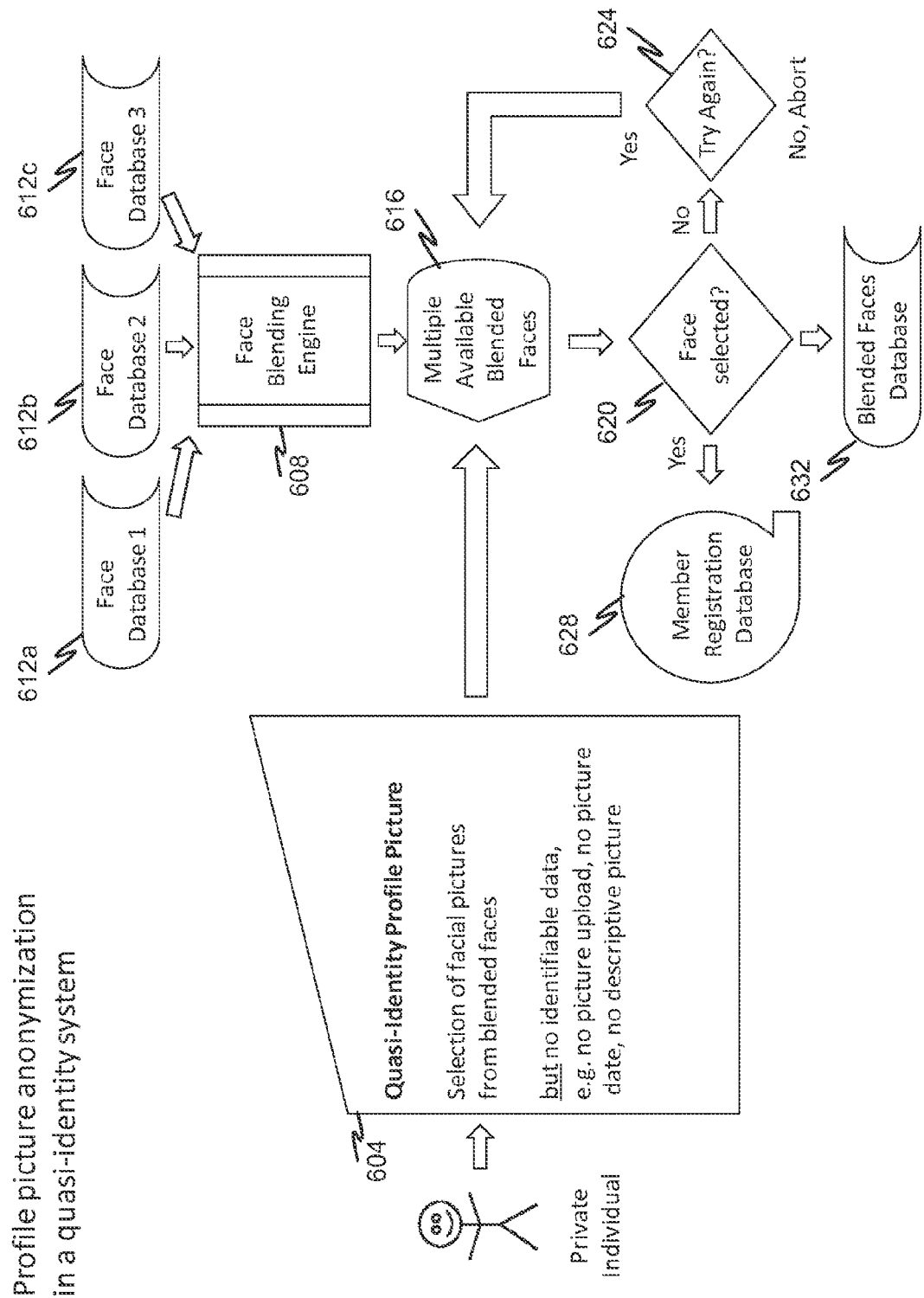
FIG. 6 is a diagram depicting a profile picture anonymization process in accordance with embodiments of the present disclosure.

With reference now to FIG. 6, a profile picture anonymization process will be described in accordance with embodiments of the present disclosure. In particular, since private member activity is maintained under a pseudonym, there may be a desire to also anonymize a member's profile picture. Thus, the process begins with the member providing a selection of facial pictures from blended faces 604. It should be noted, however, that no identifiable data (e.g., real pictures, picture descriptions, etc.) is uploaded to the application or website. Instead, the member is allowed to choose a blended face or picture generated by a face blending engine 608. The face blending engine 608 may receive pictures from one or multiple face databases 612*a-c* and then blend them in a way to produce a non-real profile picture. A plurality of non-real profile pictures may be presented to the user 616 and the user may be allowed to select a quasi-identity profile picture from the plurality blended faces. If a face is selected (step 620), then the profile picture is stored in connection with that member's profile in the member registration database 628. Additionally, if the member created a new blended face, then that blended face may be provided back to the blended faces database 632, which may be the same or similar to one of the databases 612*a-c*. If a face is not selected, then the decision is made whether to try the selection process again or abort the picture selection process (step 624). If the process is begun again, then the process returns to step 616, otherwise, the process is aborted.

Figure 7:
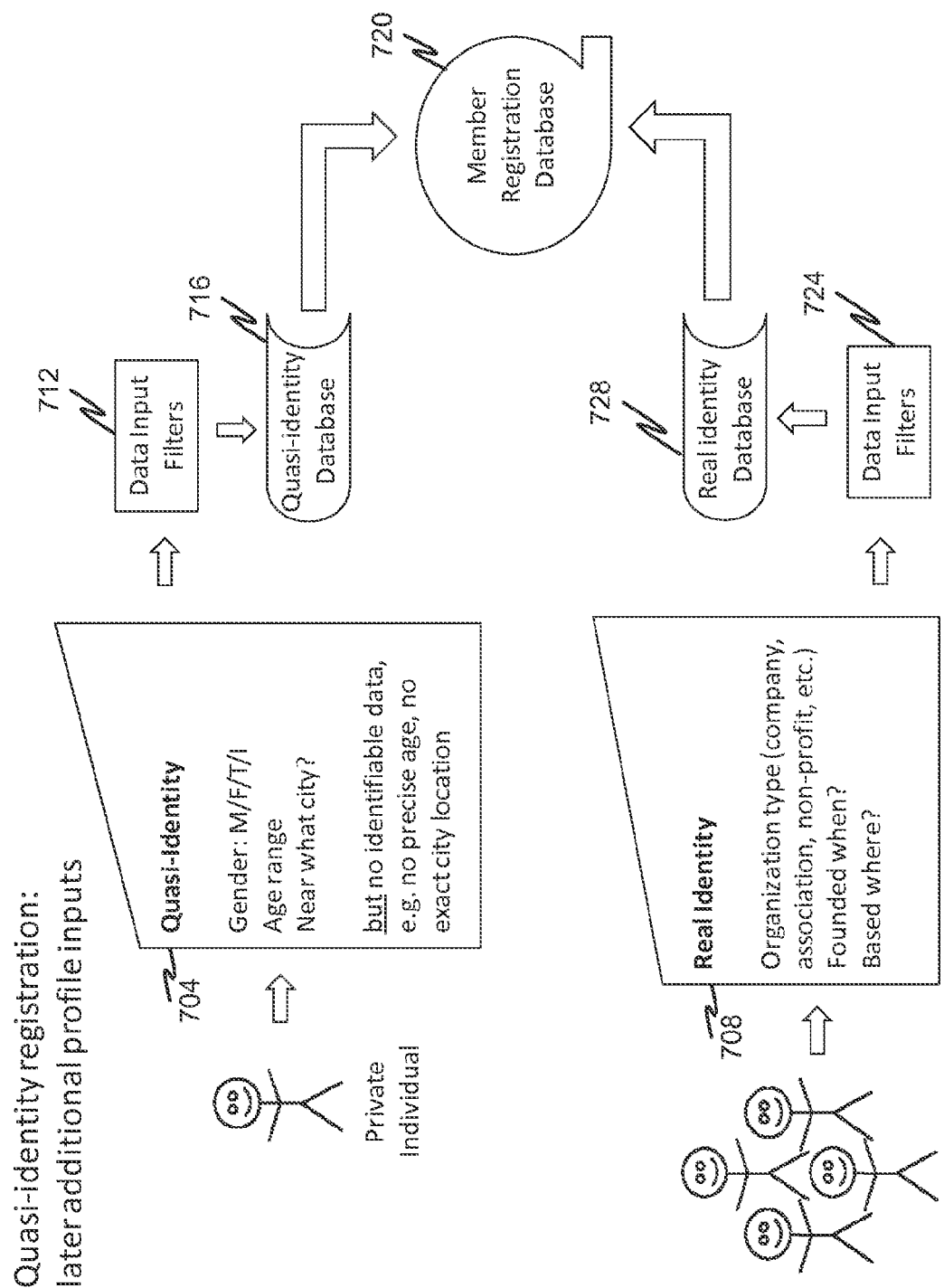
FIG. 7 is a diagram depicting a profile input process in accordance with embodiments of the present disclosure.

With reference now to FIG. 7, a method of providing further profile inputs to a member's registration/profile will be described in accordance with embodiments of the present disclosure. The quasi-identity can be updated with additional information 704 such as gender information, age range information, and nearest city information. It should be noted that still no identifiable data is requested in connection with a quasi-identity of a private member.

The real identity can be updated with additional information 708 such as organization type, founding date, home location, and other types of information known to be included in real identity profiles. The updated information 704, 708 can be process through appropriate data filters 712, 724 to ensure that that input data is provided in the correct format. Furthermore, the data input filter 712 for the quasi-identity information may further check the input data to ensure that no private/identifiable data is being input. Once processed, the input data can be stored in databases 716, 720, and 728.

Figure 8:
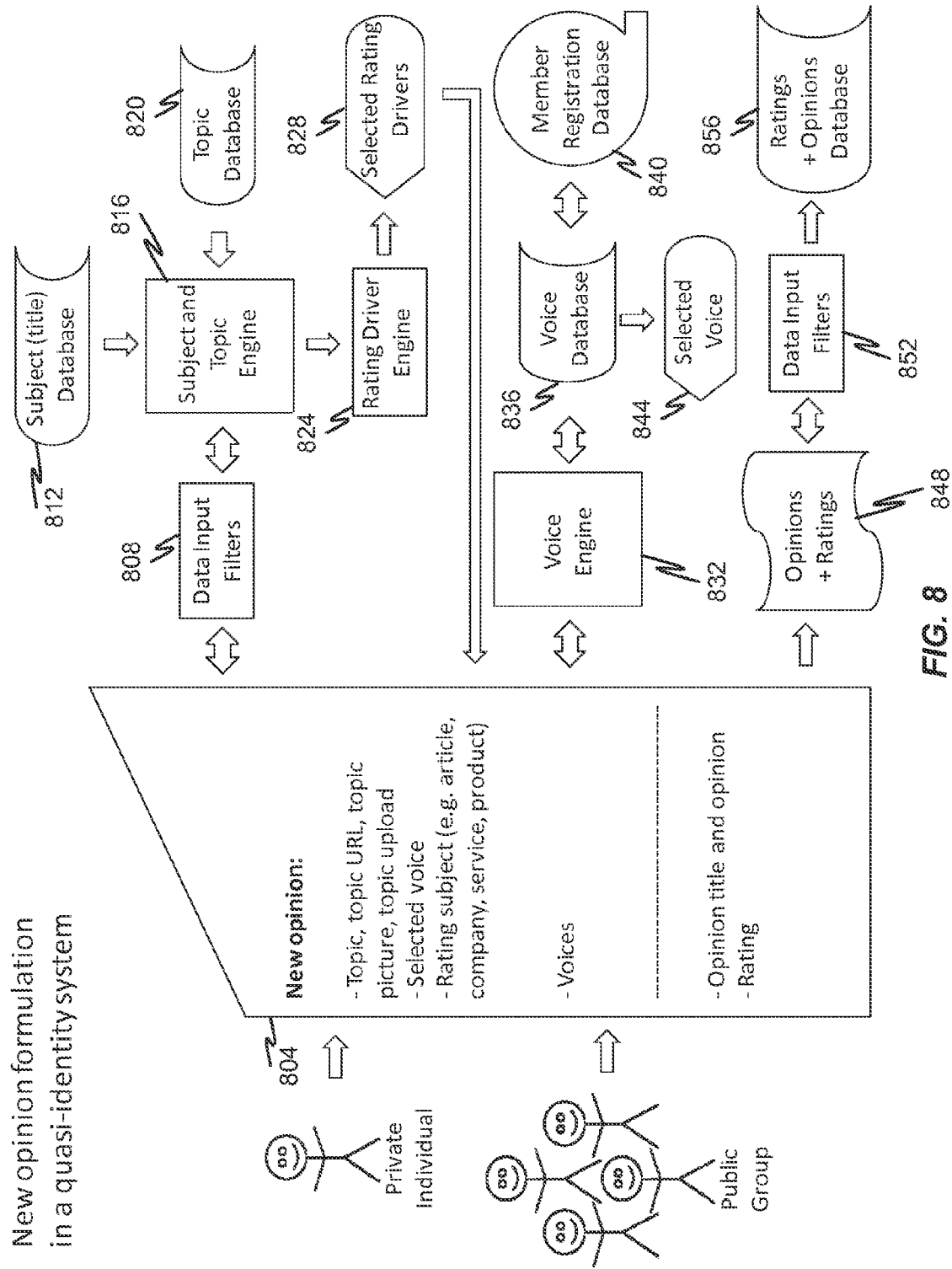
FIG. 8 is a diagram depicting a new opinion formulation process in accordance with embodiments of the present disclosure.

With reference now to FIG. 8, a process of forming a new opinion will be described in accordance with at least some embodiments of the present disclosure. The process begins when a member (public or private) begins creating a new opinion 804. A new opinion may include a topic, topic URL, topic picture, topic upload, or some other information that helps identify a point of reference for the topic. The member then selects a voice with which to provide the opinion. The opinion may further include a rating in which the subject of the opinion is rated. The new opinion is then processed by a couple of different engines for distribution through the application or website.

First, the opinion is processed through a data input filter 808 to ensure that the opinion meets certain minimum opinion standards (e.g., has some content) and to ensure that other opinion requirements are met. The opinion data is then processed by a subject and topic engine 816 that uses a subject database 812 and topic database 820 to determine a subject and topic to assign to the opinion (either programmatically or based on feedback from the member providing the opinion). Then the opinion is provided to a rating driver engine 824 that associates the rating within the opinion with the subject and topic. The opinion is then provided to a selected rating drivers 828 to formulate a final rating of the opinion along with a final subject and topic for assignment to the member and that member's voice.

The opinion is then feedback to a voice engine 832 that updates that member's voice with the newly added opinion. The voice database 836 is used to determine the selected voice 844 of the member and then assign the newly-formed opinion to that selected voice 844. The opinion along with its selected voce, subject, topic, and rating are then stored in the member database 840.

Other members are then allowed to view the opinion along with the information associated therewith (e.g., subject, topic, rating, voice, etc.) 848. Furthermore, the opinion can be stored in a ratings database 856 for searching by other members and further rating by those members (e.g., a peer review process). Storage of the opinion and additional ratings may be dependent upon the data passing through the data input filters 852 first.

Figure 9:
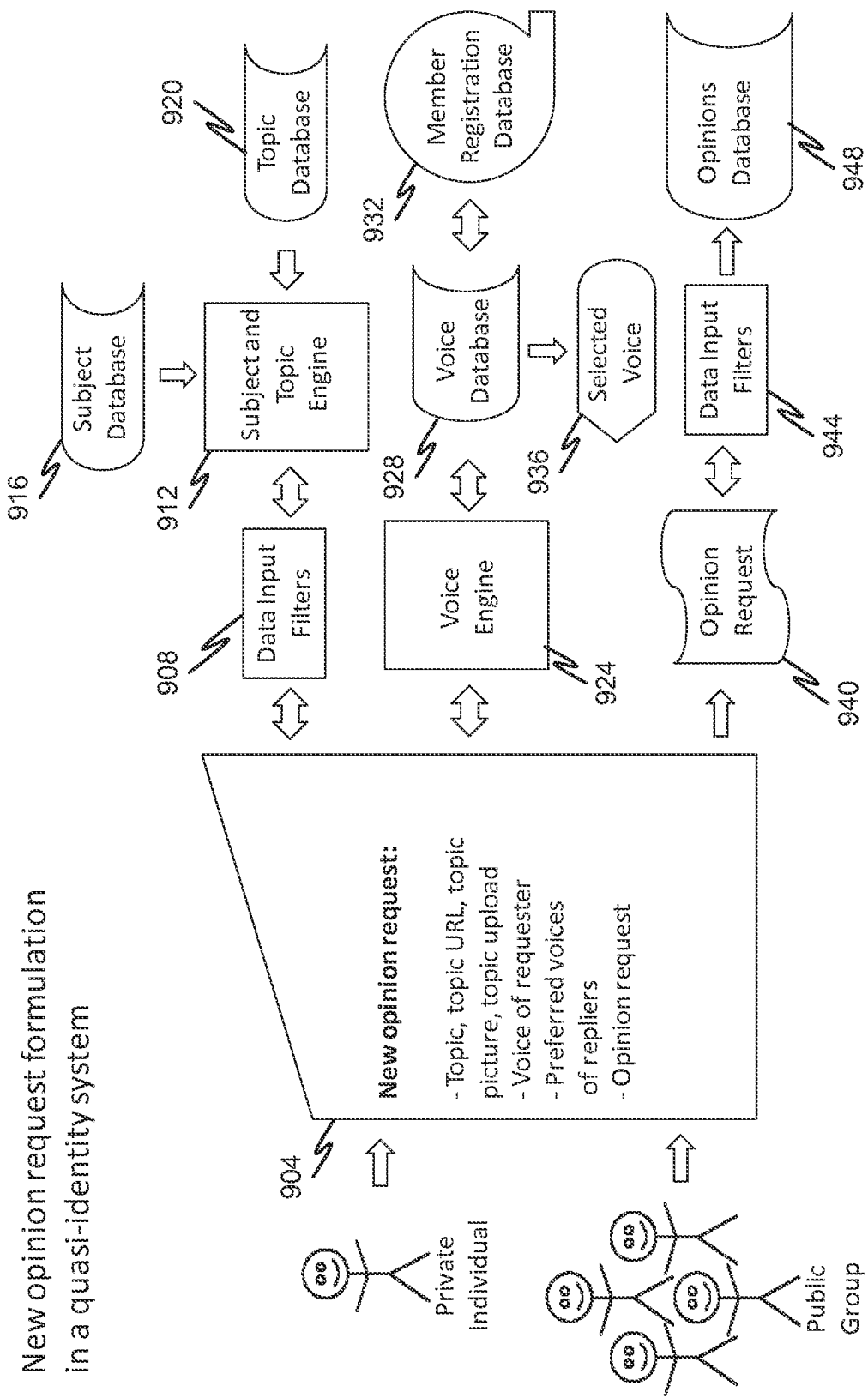
FIG. 9 is a diagram depicting a new opinion request formulation process in accordance with embodiments of the present disclosure.

With reference now to FIG. 9, a method of requesting a new opinion formulation will be described in accordance with at least some embodiments of the present disclosure. The method begins when a private or public member formulates a new opinion request 904. The new opinion request may include a top, topic URL, topic picture, topic upload, or the like. The new opinion request may further include a voice of the requestor, preferred voices for the reply (e.g., formulation of the opinion) and the opinion request. The new opinion request 904 may be formed by simultaneous access to a subject and topic engine 912 (via a data input filter 908), voice engine 924, and opinions request page 940.

The subject and topic engine 912 is configured to access the subject database 916 and topic database 920 to determine the appropriate subject and topic for the requested opinion. Likewise, the voice engine 924 accesses the voice database 928 and/or member registration database 932 to determine an appropriate voice (e.g., a selected voice 936) for the opinion.

The opinion request page 940 may correspond to the final page created by the member when the request for the opinion is finalized. The opinion request page may then be updated as members provide opinions in response to the request and these new opinions may be provided to the opinions database 948 via the data input filters 944. In some embodiments, only certain members are provided with the permissions to request new opinions on topics. Such moderators of subtopics may earn this privilege by achieving a minimum credibility score within the application or website or by acting as a semi-public member.

Figure 10:
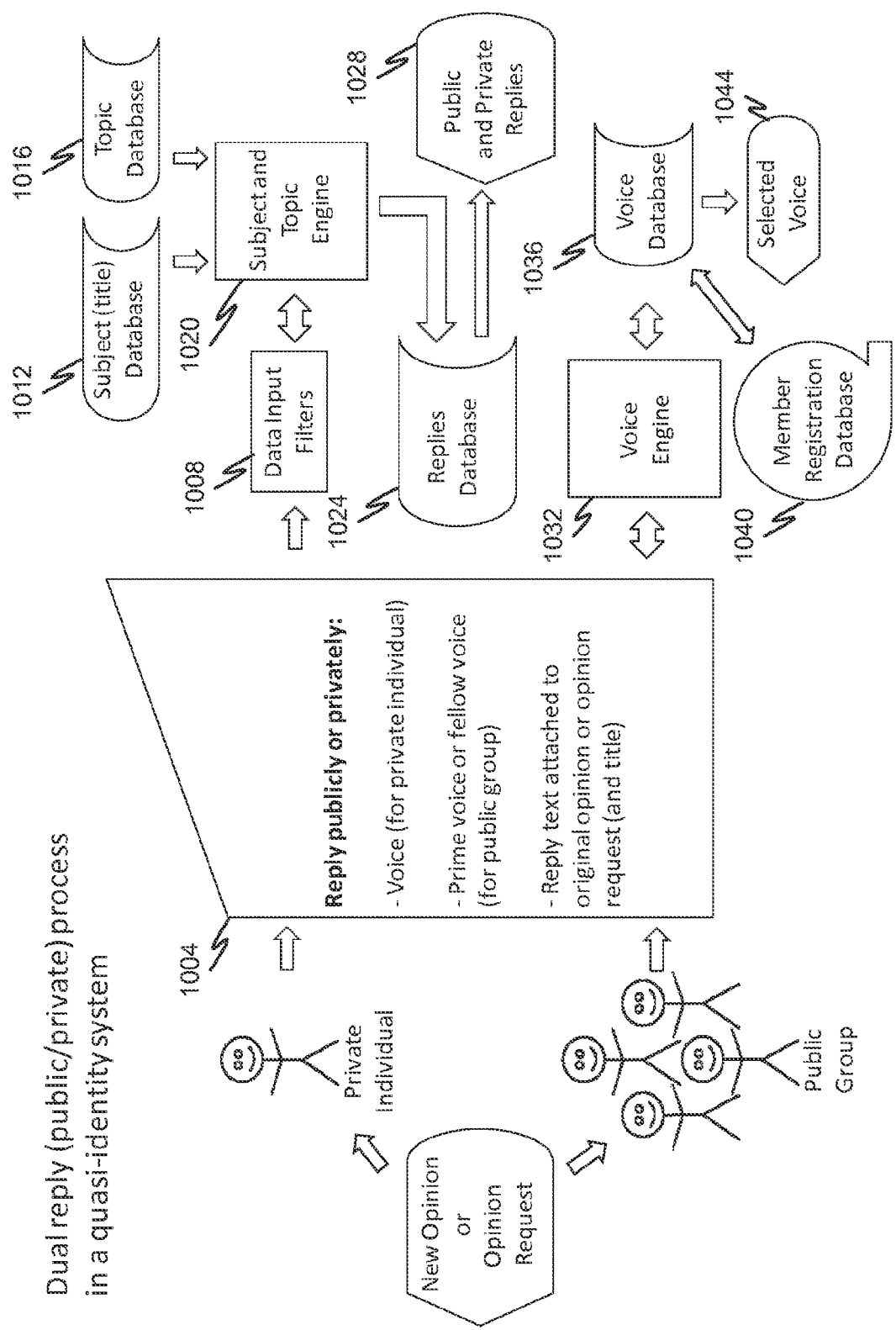
FIG. 10 is a diagram depicting a dual reply process in accordance with embodiments of the present disclosure.

With reference now to FIG. 10, a process for replying to an opinion request will be described in accordance with at least some embodiments of the present disclosure. The process begins in response to a request for a new opinion, as discussed in connection with FIG. 9. When such a request is issued, the private and public members may be allowed to provide an opinion in a selected voice along with a textual reply attached to the original opinion or opinion request. In some embodiments, the reply may again rely on access to the subject and topic engine 1020 via a data input filter 1008. The subject and topic engine 1020 may access the subject database 1012 and topic database 1016 to associate the subject and topic with the reply. Moreover, the voice(s) used by the replying member(s) may be obtained by the voice engine 1032, that accesses the member database 1040 and voice database 1036 to determine the selected voice 1044 for the reply.

Once formulated by a member, the reply can be stored in a replied database 1024. The reply can be maintained as either a public or private reply 1028. A public reply corresponds to a reply made by a member and viewable by all other members. A private reply may be maintained privately (e.g., viewable by only the private member that created the reply, the requestor of the opinion, and members connected to the private member that created the reply). In other embodiments, even the private member's reply is made available publicly as a reply to the original request for opinions. It should be noted that a public or private reply may refer to the public or private nature of the communication, and not necessarily the private or public nature of the senders or recipients. In other words, a pseudonymous member can reply publicly or privately to an opinion regardless of whether he is a private member or a public figure.

Figure 11:
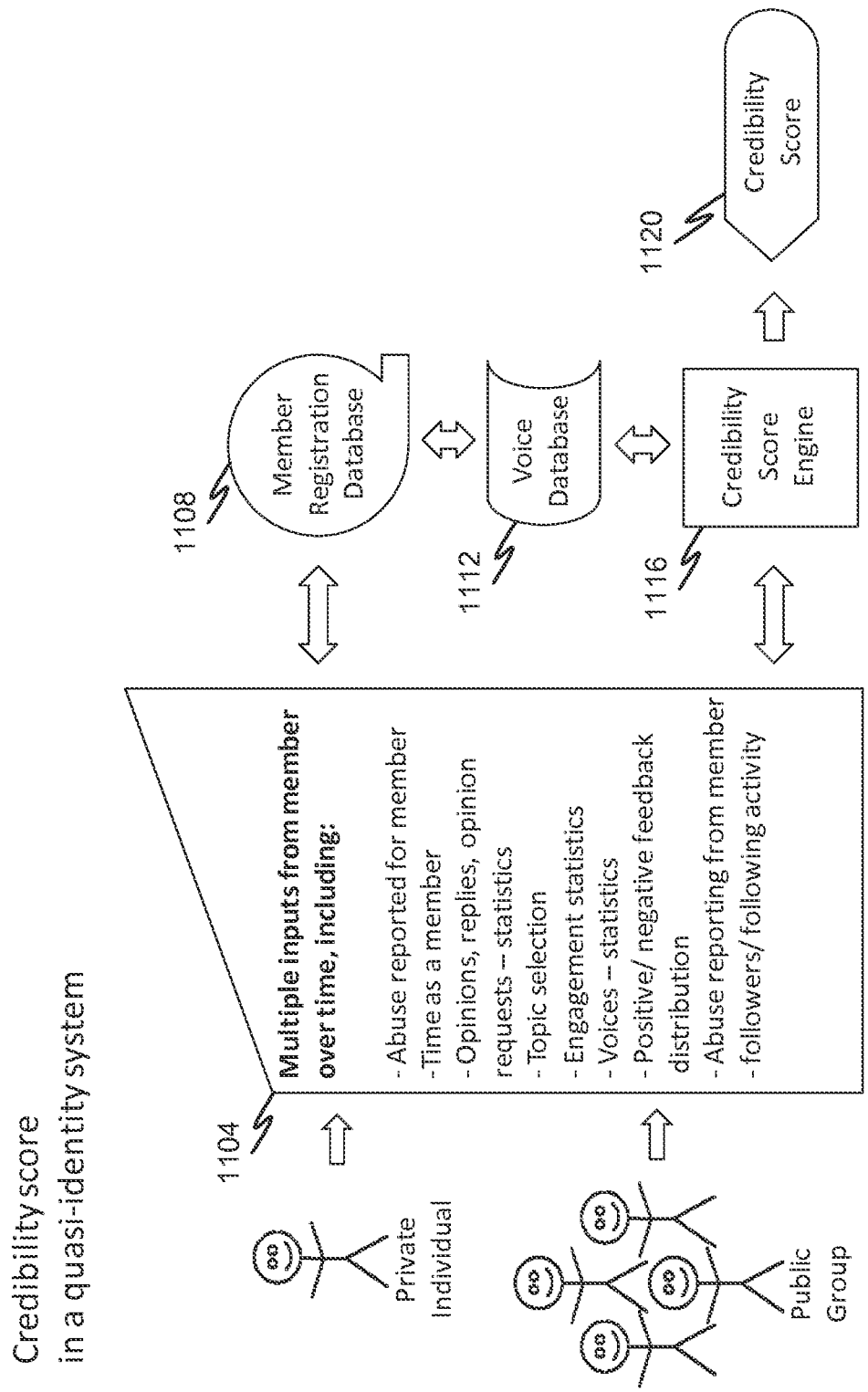
FIG. 11 is a diagram depicting a process for determining and publishing credibility scores in accordance with embodiments of the present disclosure.

With reference now to FIG. 11, a process of computing and maintaining credibility scores with the application or website will be described in accordance with embodiments of the present disclosure. As multiple inputs are received from members (public or private) over time, the credibility score for that member may be adjusted. In some embodiments, a member may start with a predetermined and neutral credibility score (say 50 out of 100). As member activity occurs, the member's credibility score may be increased (e.g., given a higher credibility score within the application or website) or decreased (e.g., given a lower credibility score within the application or website). A member's credibility score may be stored in association with a member's profile information such that it is published with any opinions or requests for opinions produced by that member.

As shown in FIG. 11, a number of factors may be considered when determining whether to increase or decrease a member's credibility score. Non-limiting examples of such factors include: abuse reports against the member; time as a member; statistics for replies, opinions, and opinion requests; topic selections; engagement statistics; voice statistics; positive/negative feedback distributions; abuse reporting from member; and followers/following activity. These factors can be used by a credibility score engine 1116 to update a member's credibility score 1120 and then store that updated credibility score in the member database 1108 and a voice database 1112 for that member.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A privacy-centric social networking application or website, comprising:
   one or more servers connected to a communication network, the one or more servers comprising processor-executable instructions that, when executed by a processor, cause the servers to facilitate interactions between private website members, wherein the processor-executable instructions include:
   an identity services module that maintains quasi-identities of the private website members, wherein quasi-identities of the private website members includes no identifiable data for the private website members, and wherein the quasi-identities of the private website members further comprises a pseudonym, password, and visual test for password recovery;
   a credibility services module that analyzes published opinions and assigns a credibility score to one or more voices of private website members based on published opinions such that an assigned credibility score for a voice of a private website member is adjustable based on the credibility score assigned to the voice of the private website member;
   a publishing services module that publishes opinions made by private website members for viewing and reaction by other private website members; and
   a database that stores the quasi-identities of the private website members along with the pseudonym, password, and visual test for password recovery of the quasi-identities, wherein the database further stores credibility scores associated with the private website members thereby allowing the private website members to access their credibility scores and have their credibility scores presented along with opinions published by the private website members, wherein the identity services module accesses the quasi-identities on the privacy-centric social networking application or website after the private web site members successfully enter the password, wherein the identity services module does not have access to any contact information of the private website members, and wherein the identity services module responds to a password recovery request from the private website members by providing the visual test for password recovery without the contact information, and receives a notification that the visual test is successfully completed thereby enabling the private website members to access the quasi-identities, to change the password and the visual test, and to reclaim assigned voices and credibility scores assigned thereto without exposing the identifiable data to the one or more servers or the database.

2. The application or website of claim 1, wherein the servers further facilitate interactions between the private website members and public website members, wherein the identity services module further includes a real-identity services module that maintains real-identities of the public website members, wherein the real-identities of the public website members includes at least some identifiable data for the public website members.

3. The application or website of claim 1, wherein the quasi-identities of the private website members further comprises at least one of a gender identification, an age range, and a nearest city identification.

4. The application or website of claim 1, wherein the credibility services module analyzes at least two or more of the following in connection with determining the credibility score: abuse reports against a member; time as a member; statistics for replies, opinions, and opinion requests; topic selections; engagement statistics; voice statistics; positive/negative feedback distributions; abuse reporting from member; and followers/following activity.

5. The application or website of claim 1, wherein each voice for a quasi-identity can be used by an associated private website member to provide opinions on different topics and subtopics.

6. The application or website of claim 1, wherein the instructions further include:

a relationship services module that connects website members with one another and, once connected, shares additional profile information and opinion information that is not available to other non-connected members of the website.

7. The application or website of claim 1, wherein the quasi-identities of the private website members include one or more quasi-identity profile pictures associated therewith, wherein the one or more quasi-identity profile pictures correspond to pictures manufactured with a plurality of actual profile pictures.

8. The application or website of claim 1, wherein the private website members are allowed to create and request opinions on one or more topics using the one or more voices.

9. A communication system, comprising:

one or more servers that facilitate opinion-based interactions between private website members, each of the one or more servers comprising a processor and computer-readable memory coupled thereto that contains processor-executable instructions, the instructions stored in the one or more servers causing the processor to perform the following:

maintain quasi-identities of the private website members, wherein quasi-identities of the private website members includes no identifiable data for the private website members, and wherein the quasi-identities of the private website members further comprises a pseudonym, password, and visual test for password recovery;

access the quasi-identities after the private website members successfully enter the password; and analyze published opinions created by the private website members and, based on the analysis, assign a credibility score to one or more voices of private website members based on published opinions such that an assigned credibility score for a voice of a private website member is adjustable based on the credibility score assigned to the voice of the private website member; and one or more databases that store the opinions created by the private website members as well as reactions to the opinions, wherein the one or more databases further stores quasi-identity profile information for each of the private website members along with the pseudonym, password, and visual test for password recovery of the quasi-identities, wherein the database further stores credibility scores associated with the private website members thereby allowing the private website members to access their credibility scores and have their credibility scores presented along with opinions published by the private website members, wherein the one or more servers do not have access to any contact information of the private website members, wherein the one or more servers respond to a password recovery request from the private website members by providing the visual test for password recovery without the contact information, and receive a notification that the visual test is successfully completed thereby enabling the private website members to access the quasi-identities, to change the password and the visual test, and to reclaim assigned voices and credibility scores assigned thereto without exposing the identifiable data to the one or more servers or the database.

10. The system of claim 9, wherein the one or more databases further store real-identity profile information for public website members, wherein the real-identity profile information for the public website members includes at least some contact information for the public website members.

11. The system of claim 9, wherein the quasi-identity profile information of the private website members further comprises at least one of a gender identification, an age range, and a nearest city identification.

12. The system of claim 9, wherein two or more of the following are analyzed in connection with determining the credibility score: abuse reports against a member; time as a member; statistics for replies, opinions, and opinion requests; topic selections; engagement statistics; voice statistics; positive/negative feedback distributions; abuse reporting from member; and followers/following activity.

13. The system of claim 9, wherein each voice for a quasi-identity can be used by an associated private website member to provide opinions on different topics and subtopics.

14. The system of claim 9, wherein the one or more servers further connect the private website members with one another and, once connected, share additional profile information and opinion information that is not available to other non-connected members of the website.

15. The system of claim 9, wherein the quasi-identity profile information of the private website members include one or more quasi-identity profile pictures associated therewith, wherein the one or more quasi-identity profile pictures correspond to pictures manufactured with a plurality of actual profile pictures.

* * * * *